Sept. 24, 1929.  R. H. CHILTON  1,729,329

TRANSMISSION BELT

Filed April 13, 1927

Inventor
Ralph H. Chilton
By Spencer Hardman & Fehr
his Attorneys

Patented Sept. 24, 1929

1,729,329

UNITED STATES PATENT OFFICE

RALPH H. CHILTON, OF DAYTON, OHIO, ASSIGNOR TO THE INLAND MANUFACTURING COMPANY, OF DAYTON, OHIO, A CORPORATION OF DELAWARE

TRANSMISSION BELT

Application filed April 13, 1927. Serial No. 183,584.

This invention relates to transmission belts of rubber and textile composition and more particularly to belts of the type employed with V-groove pulleys.

Heretofore such belts have been made by vulcanizing a cylinder of plied rubber and fabric material and then cutting off the separate V-section belts from said cylinder, as substantially disclosed in Patent No. 1,538,303 to C. R. Short. Also such belts have been made by molding each individual belt to the desired V-section, whereby the side driving surfaces of the V-belt are molded accurately to shape and the finished belt has much smoother driving surfaces than cut belts made by the Short method. The individually molded belts may if desired be provided with an outer fabric casing on its side driving surfaces whereas the cut belts may have no such fabric casing. An object of this present invention is to provide a belt which combines the advantages of both of the above described types of belts, that is, which has the substantial advantages of economy of manufacture of the first type and yet possesses the desired molded side driving surfaces of the second type.

Another object is to provide a belt which is very flexible longitudinally to permit easy bending around the pulleys but which is quite rigid against lateral compression of the inner portion thereof which engages the V-groove in the pulleys. This permits relatively high driving traction between the belt and pulley without distortion of the inner portion of the belt, even wear, and long life in use due to the small amount of heat generated in the belt by internal friction due to distortion thereof.

Another object is to provide a belt of this type having a plurality of trapezoidal tongues or inner projections whereby the depth of the belt may be made quite small for a given tractive force to be transmitted by the belt and hence greater longitudinal flexibility of the belt with all its attendant advantages obtained.

Further objects and advantages of the present invention will be apparent from the following description, reference being had to the accompanying drawings, wherein a preferred form of embodiment of the present invention is clearly shown.

In the drawings.

Similar reference characters refer to similar parts throughout the drawings.

Figure 3:
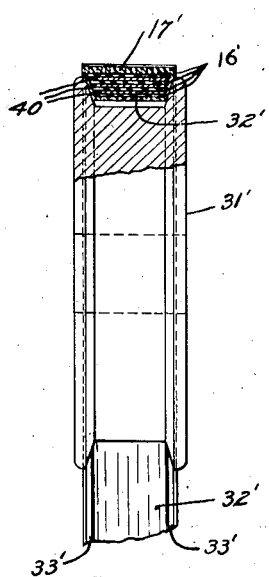
Fig. 3 shows a modified form of belt riding upon its V-pulley.

Numeral 10 designates a vulcanizing cylindrical drum (which is to be made collapsible) having a series of peripheral grooves 11 which are of the section desired for the inner portions of the finished belts. If a fabric casing for the inner portions of the belts is desired, a layer of fabric 15 (preferably bias cut) is first laid upon the drum 10 and pressed down by any suitable means into the grooves 11. Fabric 15 may be laid upon drum 10 either longitudinally thereof or helically therearound, and it is formed down into grooves 11 successively so that the length thereof required to fill each successive groove is taken from the free end thereof instead of there being a tendency to pull the fabric from the groove or grooves into which it has already been pressed. The interior space of grooves 11 is next filled with unvulcanized rubber composition 16 approximately flush with the outer surface of the fabric 15. This composition 16 may be easily formed in strips of the proper trapezoidal cross section by extrusion through a die of the proper form and then these strips laid within the grooves 11 with their ends abutting to substantially fill these grooves, as will be clear to those skilled in the art. The property especially desired in this rubber composition 16 is stiffness against lateral compression by the wedging action of the V-groove in the pulley while at the same time maintaining longitudinal flexibility so far as possible. To this end the rubber composition 16 may have transversely extending fibers or quite stiff cords embedded therein to resist lateral compression of the tongue portion of the belt, these cords being spaced apart longitudinally of the belt so as to have little or no tendency to decrease the longitudinal flexibility of the belt. This form is shown in Fig. 3 and will be described in more detail hereinbelow.

Figure 1:
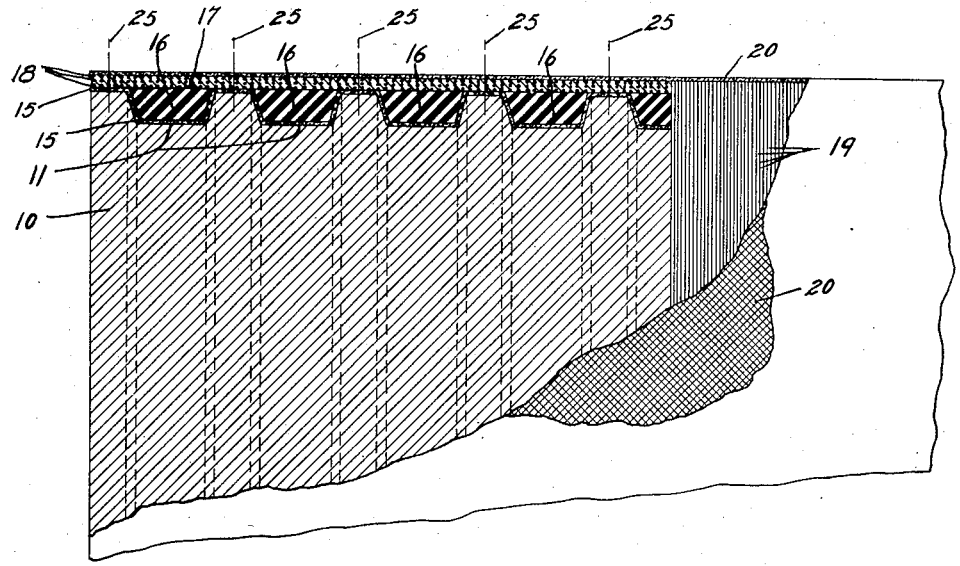
Fig. 1 shows a portion of a vulcanizing drum with the V-grooves therein in section and the rubber and fabric material laid within the grooves. The right portion of the figure shows how the non-extensible cords of the tension web extend peripherally of the drum and the bias laid outer fabric casing.

After the grooves 11 are filled as described above, rubberized fabric is wrapped around the drum 10 to form the substantially non-extensible web portion 17 of several plies 18. Preferably this web portion 17 is formed from rubberized cord fabric with the non-extensible cords 19 thereof extending peripherally around the drum 10 as clearly shown in the right side of Fig. 1, but if desired, there may be used a rubberized square woven fabric whose peripherally extending threads are tightly twisted to render them substantially non-extensible. An outer casing 20 of rubberized bias fabric is preferably provided on the outside of the non-extensible web portion 17 as a protection for the plies 18 when the belts are in use.

The drum 10 with the belt material in place thereon may be wrapped with fabric and cured in open steam, or in any other manner well known to those skilled in the art of vulcanizing rubber. After all the belt material is vulcanized, to the desired degree of hardness or softness in the different portions thereof, into a perfectly bonded unitary cylindrical form with V-tongues projecting interiorly thereof, the separate belts are cut off from this cylinder by straight radial cuts through the web portion 17, as shown at the lines 25 in Fig. 1. It is thus seen that there will be no waste of the vulcanized material as there is in the Short Patent 1,538,303.

Figure 2:
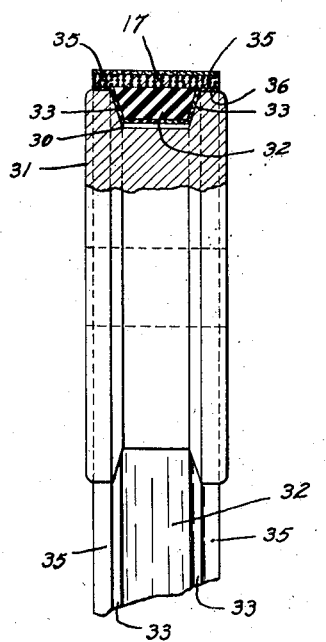
Fig. 2 shows a belt made according to this invention riding upon its V-pulley.

Fig. 2 shows one of the belts made by the above method riding in the V-groove 30 of the pulley 31. It will be noted that the inner or V-tongue portion 32 of the belt which engages the driving surfaces of the pulley will be accurately molded to shape and will have perfectly smooth uniform driving surfaces 33 in contact with the pulley driving surfaces.

The short overlapping edges 35 of the substantially non-extensible web portion 17 of the belt apparently ride upon the flat portion 36 of pulley 31 but are sufficiently yieldable to permit the lateral edges 33 of the V-tongues 32 to take the radial pressure between the belt and pulley. It is thus seen that the V-tongues 32 are made of less lateral width than the flexible non-extensible web 17 and by having such reduced lateral width their transverse stiffness or resistance to distortion by the wedging action of the V-groove will be enhanced. Of course if the tensile force to be transmitted by the web 17 permits, the overlapping portions 35 can be made as short as desired, or entirely omitted, simply by cutting the grooves 11 in the drum 10 closer together.

Fig. 3 illustrates a modification wherein the overlapping lateral portions of the non-extensible web 17' have been practically omitted by cutting the grooves in the drum upon which these belts were vulcanized very close together. The V-tongues 32' have their resistance to lateral compression increased by the transversely extending relatively stiff cords 40 embedded in the rubber as described above. In the manufacture of this belt, the rubber composition 16' (which is to be laid in grooves 11 of the drum 10) is preferably first formed on any suitable drum by laying thereon alternate layers of unvulcanized rubber and rubberized cords having the cords 40 therein extending axially of the drum. After the desired thickness is thus plied up, V-section strips 16' are cut off by a suitable knife set at the proper angle against the rotating drum, and these strips 16' are then inserted in the grooves 11 of the vulcanizing drum to substantially fill the same. The remaining steps of the process may be substantially as described above.

Figure 4:
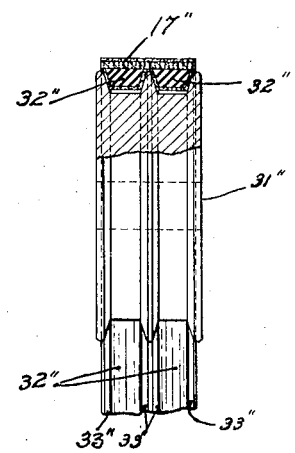
Fig. 4 shows another modified form of belt made according to this invention and riding upon its double V-groove pulley.

Fig. 4 illustrates a modification wherein two V-tongues 32'' are provided for running in a double grooved pulley 31''. By thus providing four driving surfaces 33'' instead of only two, as in Figs. 2 and 3, the depth of the V-tongues 32'' may be greatly decreased for the same tractive force to be transmitted, thus providing greater longitudinal flexibility of the belt. This is particularly desirable in use with pulleys of small diameter. The method of manufacture of this belt may be the same as that of the belt of either Fig. 2 or Fig. 3, however since the V-tongues 32'' are of relatively narrow width no reinforcement against lateral compression is ordinarily necessary to give good results. A belt of the proper width may be provided with more than two V-tongues 32'' and these tongues may be made relatively smaller with respect to the dimensions of the non-extensible web 17'' than as shown, it being necessary only that the tongues be large enough to track properly in their respective grooves in the pulleys.

While the form of embodiment of the present invention as herein disclosed, constitutes a preferred form, it is to be understood that other forms might be adopted, all coming within the scope of the claims which follow.

What is claimed is as follows:

1. The steps in the method of making transmission belts comprising: providing a vulcanizing mold having a series of peripheral ring-shaped V-section grooves therein, laying a fabric lining over said mold to cover the walls of said grooves, filling the interior space of said grooves with a vulcanizable rubber composition substantially flush with the periphery of the mold, wrapping rubberized fabric around the outside of the filled grooves, vulcanizing the whole together, and then cutting off individual belts from the vulcanized unit.

2. The steps in the method of making transmission belts comprising: providing a vulcanizing mold having a series of peripheral ring-shaped V-section grooves therein, filling the grooves with a vulcanizable material substantially flush with the periphery of the mold, wrapping vulcanizable fabric around the outside of the filled grooves, vulcanizing the whole together to form an integral unit, and then cutting off individual belts from the vulcanized unit.

3. The steps in the method of making transmission belts comprising: providing a vulcanizing mold having a series of peripheral ring-shaped V-section grooves therein, filling the grooves substantially flush with mold periphery with a vulcanizable rubber and textile material, applying rubberized fabric around the outside of the mold and in contact with material in all the filled grooves, and then vulcanizing the whole together.

4. The steps in the method of making transmission belts comprising: providing a vulcanizing mold having a series of peripheral ring-shaped V-section grooves therein, filling the grooves flush with the mold periphery with a vulcanizable material, applying a continuous rubberized fabric web upon the periphery of the mold around the outside of the filled grooves therein, and then vulcanizing the whole together to form a cylindrical unit with a plurality of V-section tongues spaced axially and extending around its interior surface.

5. The steps in the method of making transmission belts comprising: providing a vulcanizing mold having a series of peripheral ring-shaped V-section grooves therein, filling the grooves flush with the mold periphery with a vulcanizable material having the desired properties in that portion of the belt to be formed, applying a vulcanizable web of other desired properties around the outside of said series of filled grooves, vulcanizing the whole together, and then cutting off individual belts by straight peripheral cuts between said grooves.

6. The method of making transmission belts comprising: molding the inner portion of the belts in laterally tapered peripheral grooves cut in a cylindrical mold and simultaneously vulcanizing the outer portion of the belts thereto in a continuous cylindrical form applied upon the outside of a plurality of said grooves, and then cutting the integrated vulcanizing unit into separate belts.

7. The method of making transmission belts comprising: molding the inner portion of the belts in laterally tapered peripheral grooves cut in a cylindrical mold and vulcanizing the outer portion of the belts in a unitary cylindrical form applied upon the outside of said cylindrical mold and embracing a plurality of said grooves, and then dividing the integrated vulcanized unit into separate belts by straight radial cuts through the outer portion intermediate the projecting V-portions.

8. The method of making V-section transmission belts comprising: providing a vulcanizing drum having a series of peripheral V-section grooves therein, applying a relatively wide sheet of rubberized fabric upon said drum and pressing the same down into said grooves so as to lie along the walls of said grooves, filling the remaining portions of said grooves with vulcanizable material to form an unbroken cylindrical outer surface to said drum, wrapping rubberized fabric upon the materials on the drum to form a continuous web embracing a plurality of said grooves, vulcanizing the whole together to form an integral unit, and then cutting off individual belts from said integral unit by peripheral cuts between the V-section tongue portions molded within said grooves.

In testimony whereof I hereto affix my signature.

RALPH H. CHILTON.